US011856408B2

(12) United States Patent
Pierson et al.

(10) Patent No.: US 11,856,408 B2
(45) Date of Patent: Dec. 26, 2023

(54) METHODS AND SOFTWARE FOR PAIRING WIRELESS DEVICES USING DYNAMIC MULTIPATH SIGNAL MATCHING, AND WIRELESS DEVICES IMPLEMENTING THE SAME

(71) Applicant: Trustees of Dartmouth College, Hanover, NH (US)

(72) Inventors: Timothy J. Pierson, Hanover, NH (US); Jonathan F. Alter, Chicago, IL (US)

(73) Assignee: Trustees of Dartmouth College, Hanover, NH (US)

( * ) Notice: Subject to any disclaimer, the term of this patent is extended or adjusted under 35 U.S.C. 154(b) by 152 days.

(21) Appl. No.: 17/514,245

(22) Filed: Oct. 29, 2021

(65) Prior Publication Data

US 2023/0136293 A1 May 4, 2023

(51) Int. Cl.
*H04L 29/06* (2006.01)
*H04W 12/50* (2021.01)
(Continued)

(52) U.S. Cl.
CPC ............ *H04W 12/50* (2021.01); *G16Y 30/10* (2020.01); *H04B 17/318* (2015.01);
(Continued)

(58) Field of Classification Search
CPC ... H04W 12/50; H04W 12/041; H04W 12/06; H04W 76/10; H04B 17/318;
(Continued)

(56) References Cited

U.S. PATENT DOCUMENTS

| 9,888,021 B2* | 2/2018 | Horesh | G06N 20/00 |
| 2008/0004036 A1* | 1/2008 | Bhuta | G01S 5/0263 |
| | | | 455/12.1 |
| 2019/0266817 A1* | 8/2019 | Lucy | G08B 13/2491 |

FOREIGN PATENT DOCUMENTS

WO 2016210125 A1 12/2016

OTHER PUBLICATIONS

Faria, Daniel B., and David R. Cheriton. "Detecting identity-based attacks in wireless networks using signalprints." Proceedings of the 5th ACM workshop on Wireless security. 2006. (Year: 2006).*

(Continued)

*Primary Examiner* — Shawnchoy Rahman
(74) *Attorney, Agent, or Firm* — Downs Rachlin Martin PLLC

(57) ABSTRACT

Methods of pairing devices wirelessly that include matching received-signal-strength information regarding signal-strength patterns received by differing devices desired to be paired. In some embodiments, signal-strength patterns are based on a user moving an object so as to intentionally create multipath Fresnel-zone propagation disturbances. During pairing, the devices exchange their received-signal-strength information with one another and compare the received-signal-strength information that they receive from another device to the received-signal-strength information that they generated themselves based on the multipath Fresnel-zone propagation disturbances. When the two sets of receive-signal-strength information substantially match one another, the devices determine the presence of a trusted relationship. Methods for assisting with the wireless pairing are also disclosed. Disclosed methods can be encoded in software/firmware, and such software/firmware can be stored in devices desired to include disclosed wireless pairing functionality.

25 Claims, 6 Drawing Sheets

(51) Int. Cl.
        *H04W 76/10*      (2018.01)
        *H04B 17/318*     (2015.01)
        *H04L 43/16*      (2022.01)
        *H04W 12/06*      (2021.01)
        *H04L 9/32*       (2006.01)
        *H04W 12/041*     (2021.01)
        *G16Y 30/10*      (2020.01)

(52) U.S. Cl.
        CPC ............ *H04L 9/3236* (2013.01); *H04L 43/16* (2013.01); *H04W 12/041* (2021.01); *H04W 12/06* (2013.01); *H04W 76/10* (2018.02); *H04L 2209/80* (2013.01)

(58) Field of Classification Search
        CPC ... H04L 9/3236; H04L 43/16; H04L 2209/80; H04L 9/0643
        See application file for complete search history.

(56) References Cited

OTHER PUBLICATIONS

Mathur, Suhas et al., ProxiMate: Proximity-based Secure Pairing using Ambient Wireless Signals; MobiSys '11, Jun. 28-Jul. 1, 2011, Bethesda, Maryland; ACM 978-1-4503-0643-0/11/06; pp. 211-224.

Pierson, Timothy J. et al.; Wanda: securely introducing mobile devices; IEEE Infocom 2016—the 35th Annual IEEE International Conference on Computer Communications; pp. 1-9.

Mayrhofer, Rene et al.; Shake Well Before Use: Intuitive and Secure Pairing of Mobile Devices; IEEE Transactions on Mobile Computing, vol. 8, No. 6, Jun. 2009; pp. 792-806.

Ham, Seongmin et al.; Quick Talk: An Association-Free Communication method for IoT Devices in Proximity; Proceedings of the ACM on Interactive, Mobile, Wearable and Ubiquitous Technologies, vol. 1, No. 3, Article 56, Sep. 2017; pp. 1-18.

Soriente, Claudio et al.; (2007) HAPADEP: Human-Assisted Pure Audio Device Pairing; IACR Cryptology ePrint Archive. Report 2007/093; DBLP Jan. 2007; pp. 1-11.

Brown, Anthony et al.; MultiNet: Reducing Interaction Overhead in Domestic Wireless Networks; Session: Design for the Home; CHI 2013: Changing Perspectives, Paris, France, pp. 1569-1578; Apr. 27-May 2, 2013.

Cai, Liang et al.; Good Neighbor: Ad Hoc Pairing of Nearby Wireless Devices by Multiple Antennas; Networking and Distributed Systems Symposium (NDSS) Jan. 1, 2011; pp. 1-20.

Holmquist, Lars Erik et al.; (Sep. 2001) Smart—Its Friends: A Technique for Users to Easily Establish Connections between Smart Artefacts; pp. 1-7; Ubiquitous Computer (Ubicomp); Lecture notes in Computer Science; Springer Berlin Heidelberg, 2001; pp. 116-122. DOI: 10.1007/3-540-45427-6_10; DBLP.

* cited by examiner

METHODS AND SOFTWARE FOR PAIRING WIRELESS DEVICES USING DYNAMIC MULTIPATH SIGNAL MATCHING, AND WIRELESS DEVICES IMPLEMENTING THE SAME

FIELD OF THE INVENTION

The present invention generally relates to the field of pairing of wireless devices. In particular, the present invention is directed to methods and software for pairing wireless devices using dynamic multipath signal matching, and wireless devices implementing the same.

BACKGROUND

At least one source projects that 43 billion Internet of Things (IoT) devices will be deployed worldwide by 2023. Common household items and consumer goods, such as thermostats, light bulbs, toothbrushes, fitness trackers, and appliances may soon require an Internet connection to take full advantage of their features. While many of these devices will bring new conveniences and enhancements to people's lives, they will also create problems for the end user and for security.

For the end user, frustrations with setup and security practices are likely. Manufacturers cannot easily pre-configure devices to work with a user's existing electronics since these existing devices and their pairing credentials are unknown at the time of production. For example, a manufacturer of Internet-connected thermostats will not know the name or Wi-Fi® password of an end-user's wireless network and cannot program the device to immediately pair with their access point (AP). As a result, end-users may have to set up dozens (or potentially hundreds) of new devices on their own.

Configuring new wireless devices can already be challenging for elderly and non-tech-savvy audiences. Many of these new devices, however, will lack touchscreens and keyboards to which users have grown accustomed for device setup. With existing pairing protocols, users may need a secondary device, such as a smartphone, to facilitate configuration. Confusion surrounding the setup process is likely to grow as users need to learn new methods from multiple manufacturers to configure their devices.

The addition of new devices will also require users to create and recall many passwords. Manufacturers may require users to create accounts and login credentials to access data from their new device via a phone or computer, while the devices themselves may have passwords for making changes to hardware settings. Many users cannot remember numerous different passwords and will reuse simple passwords across devices and accounts or write down and store passwords in plain sight. These strategies create security problems of their own and make the user and their devices more vulnerable to adversarial attacks.

The security practices of manufacturers and limitations of existing pairing protocols also create a range of vulnerabilities. Researchers discovered that twenty-nine out of forty of the most popular IoT devices sold on Amazon.com in 2020 have "no security protocols deployed, or have problematic security protocol implementations." Poor security implementations enabled the formation of the "Mirai" botnet. The Mirai botnet was a distributed network of IoT devices infected with remote-access malware. Its creators were able to install malicious code on devices by gaining unauthorized access using default passwords assigned by the manufacturer. Since an end-user is rarely required to change these passwords, gaining entry to the devices was easy. Although used for a variety of malicious deeds, the Mirai botnet is perhaps best known for its DDoS (Distributed Denial of Service) attack in October 2016. The attack brought down the domain name system (DNS) operated by Dyn, Inc. (Manchester, New Hampshire (now part of Oracle Corporation, Austin, Texas)), preventing Internet users from accessing popular online services like Spotify and GitHub.

Even with strong passwords chosen by an end-user, traditional pairing protocols like Wi-Fi® and Bluetooth® facilitate adversarial attacks by only performing one-way authentication. Under a one-way authentication scheme, only one device verifies the legitimacy of the other. A user's Wi-Fi® password prevents a malicious device from connecting to their AP, but does not prevent the user from pairing a new device with a spoofed AP. Known as an "evil twin attack," an adversary can eavesdrop on the legitimate user's Internet traffic once connected to the fake AP. Bluetooth PINs (personal identification numbers) similarly stop an adversary from connecting to a wireless device but do not prevent an adversary from spoofing that same device. An unsuspecting user may be fooled into connecting, allowing the adversary to deliver a malicious payload onto the target device (e.g., a phone or computer).

These attacks are possible because new devices have no basis of trust. Some have suggested using public key infrastructure (PKI) in conjunction with existing pairing protocols to provide two-way authentication, where each device can verify the other. Under this scheme, all devices would be given a certificate signed by a certificate authority (CA) at the time of manufacture. When two devices are ready to pair, each can verify the certificate of the other to validate authenticity. For unconfigured IoT devices, however, this idea is impractical. For example, IoT devices often have limited memory and computational power. Verifying certificates is a computationally-expensive process and may require an IoT gadget to store dozens of CA public keys in memory. As such, the hardware of many IoT gadgets will preclude their ability to run public key cryptography. Additionally, many IoT devices will not have an Internet connection at the time of setup. Accordingly, if a device provides a certificate that has been revoked by a CA, the IoT gadget will have no way of checking that the certificate is up to date. Even if the hardware can run the complex cryptography needed for PKI (e.g., RSA (Rivest-Shamir-Adleman cryptographic system)), the lack of an Internet connection at the time of setup prevents an IoT device from adequately authenticating another.

SUMMARY OF THE DISCLOSURE

In one implementation, the present disclosure is directed to a method of pairing wireless devices. The method includes performing a pairing process that includes wirelessly transmitting, from a first wireless device during a time period, a send signal; wirelessly receiving, by the first wireless device from a second wireless device during the time period, a receive signal; generating, by the first wireless device, first signal-strength-pattern information regarding a first signal-strength pattern of the receive signal received during the time period as determined by the first wireless device; wirelessly receiving, by the first wireless device from the second wireless device, second signal-strength-pattern information regarding a second signal-strength pattern of the send signal received during the time period by the second wireless device as determined by the second wireless device; determining, by the first wireless device, whether or not the first signal-strength-pattern information and the second signal-strength-pattern information substantially match one another; and when the first wireless device determines that the first signal-strength-pattern information and the second signal-strength-pattern information substantially match one another, determining that the second wireless device is a trusted device.

In another implementation, the present disclosure is directed to a wireless device, which includes a radio; one or more processors in operative communication with the radio; and memory in operative communication with the one or more processors; wherein the memory contains machine-executable instructions that, when executed by the one or more processors, perform the method of claim 1 using the radio for the transmitting of the send signal and the receiving of each of the receive signals and the second signal-strength-pattern information.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
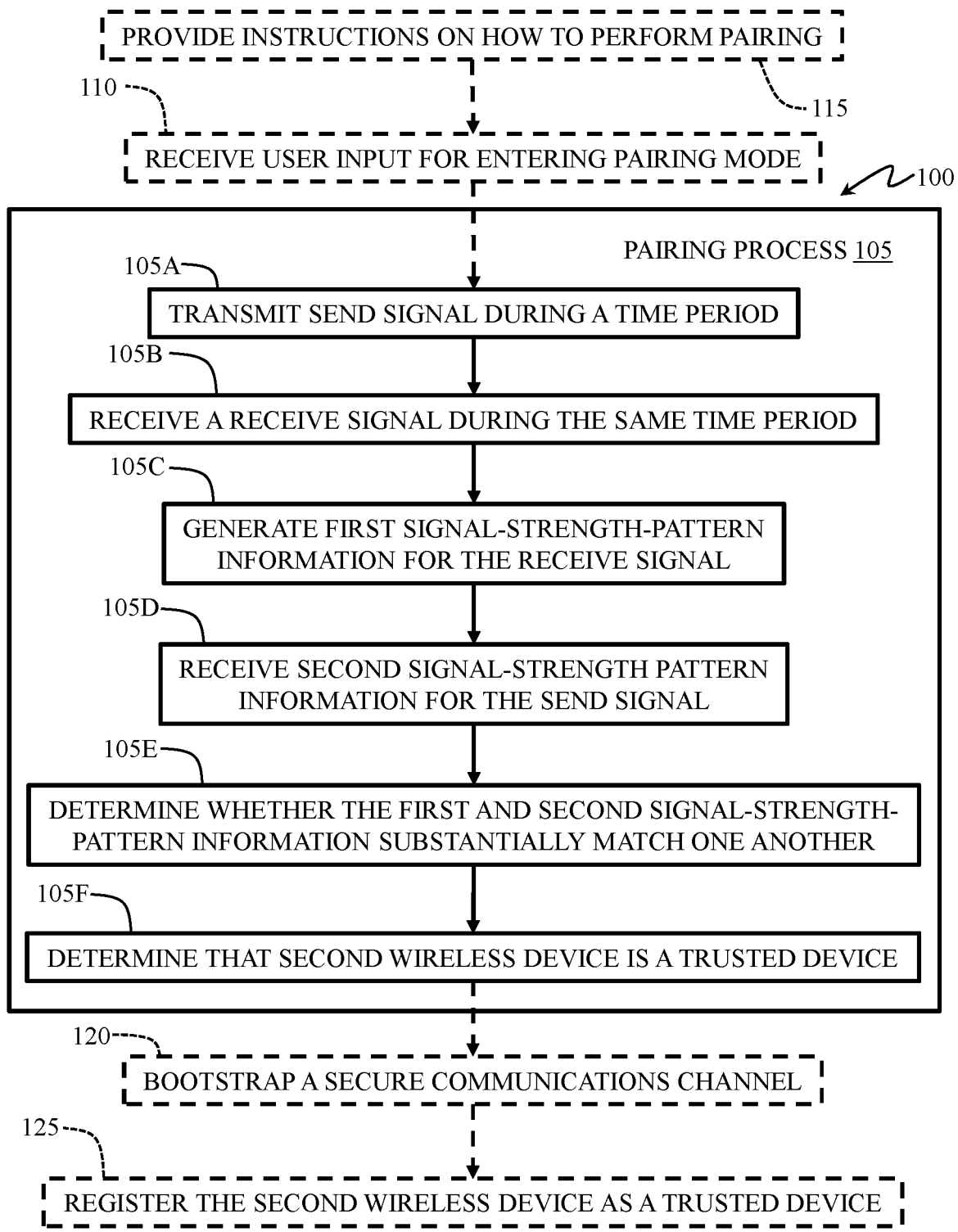
FIG. 1 is a flow diagram of an example pairing method of the present disclosure.

In some aspects, the present disclosure is directed to methods of pairing devices with one another wirelessly so that they can establish a trusted wireless communications channel between them. For the sake of the present disclosure, including the appended claims, a "wireless device" is any device having at least one wireless communications channel that can participate in pairing in accordance with the present disclosure. Consequently, such a wireless device can include both mobile and stationary devices, as well as devices that primarily use one or more wired communications channels. As used herein and in the appended claims, the term "pairing", and like terms, in the context of wireless devices shall mean the establishing of at least one trusted wireless communications channel. Fundamentally, there is no limitation on the type(s) of wireless devices involved with a pairing methodology of the present disclosure other than that they are able to wirelessly pair with one another and include the necessary hardware (e.g., wireless radio(s), processor(s), memory, etc.) and ability to execute the machine-readable instructions for performing a pairing process of the present disclosure. In some embodiments, it can also be desirable that at least a first one of the wireless devices desired to be paired, either on its own or as a proxy for another device, can be, at least temporarily, moved to or located at a location proximate to the other one of the wireless devices desired to be paired to the first one of the wireless devices. Examples of wireless devices that can be wirelessly paired with one another using a pairing process of the present disclosure include, but are by no means limited to wireless Internet access points (APs), mobile devices (e.g., smartphones, smartpads, smartwatches, laptops, etc.), desktop computers, printers, scanners, cameras, ear buds, headphones, microphones, headsets, smart appliances, audio speakers, WiFi extenders, smart thermostats, smart lighting components (e.g., LED luminaires, switches, dimmers, etc.), remote controllers (e.g., for audiovisual systems), smart healthcare devices (e.g., blood-pressure monitors, medication-delivery pumps, etc.), and smart personal grooming devices (e.g., toothbrushes, shavers, etc.), among many others. Those skilled in the art will readily understand that this list is merely illustrative and by no means exhaustive, as more and more devices are being made into "smart" wireless devices/IoT devices each year.

It is noted from the outset that the wireless pairing and the trusted wireless communications channel can each be effected using any suitable wireless protocol now existing or developed in the future. Examples of existing wireless protocols that can be implemented in methodologies of the present disclosure include, but are not limited to wireless protocols under IEEE 802.11 standards (e.g., 802.11ax, 802.11ac, 802.11n, 802.11g, 802.11b, etc.), IEEE 802.15.4 standards, and IEEE 802.16 standards, among others, including wireless standard protocols such as Wifi®, Bluetooth®, BLE (Bluetooth Low Energy), ZigBee, and WiMax, among others.

At a high level and as discussed below in detail, embodiments of a pairing method of the present disclosure leverage properties of Fresnel zones of the radio waves propagating in the free space between wireless radio devices in a pairing process and involve comparing information about signals exchanged by the wireless devices to determine whether or not a second wireless device with which a first wireless device is attempting to pair is a trusted device. Benefits of a Fresnel-zone-based pairing method of the present disclosure include the facts that a user is involved with and can control the process and that each wireless device does not necessarily require any additional hardware beyond the basic radio, processor, and memory hardware that the device will typically include. Essentially all that is needed is that each wireless device be provided with the relevant software and have sufficient memory capacity and processing power to execute the software and any attendant functionality(ies), such as hashing algorithm(s), encryption algorithm(s) (e.g., symmetric encryption algorithms), and exchanging frames, among others. This is in contrast to other types of pairing methods that require additional hardware, such as an onboard accelerometer, hardware for a separate out-of-band (OOB) communications channel (e.g., optical, magnetic, sonic/ultrasonic), and an intermediary device that requires two strategically spaced-apart antennas, among other things.

In other aspects, the present disclosure is directed to software, for example, firmware, that allows a wireless device to participate in a pairing method of the present disclosure. Such software can be stored onboard the wireless device in a suitable hardware memory. Correspondingly, the wireless device may have one or more onboard processors for executing machine-executable instructions of the software. In other aspects, the present disclosure is directed to wireless devices themselves that implement a pairing method and/or corresponding software of the present disclosure.

Figure 2:
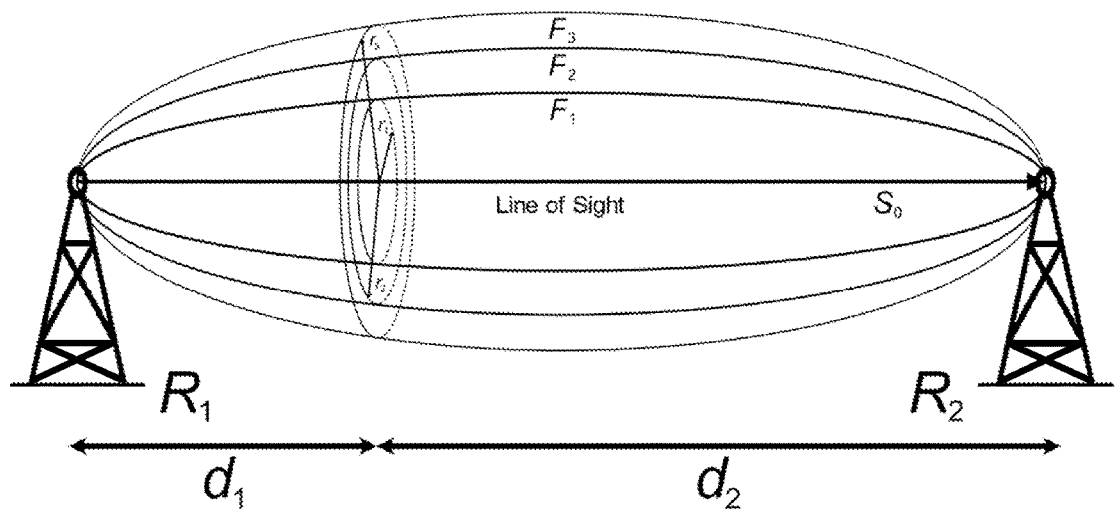
FIG. 2 is a diagram illustrating the first three Fresnel zones relative to radio-frequency (RF) waves when two wireless devices are proximate to one another.
Figure 3:
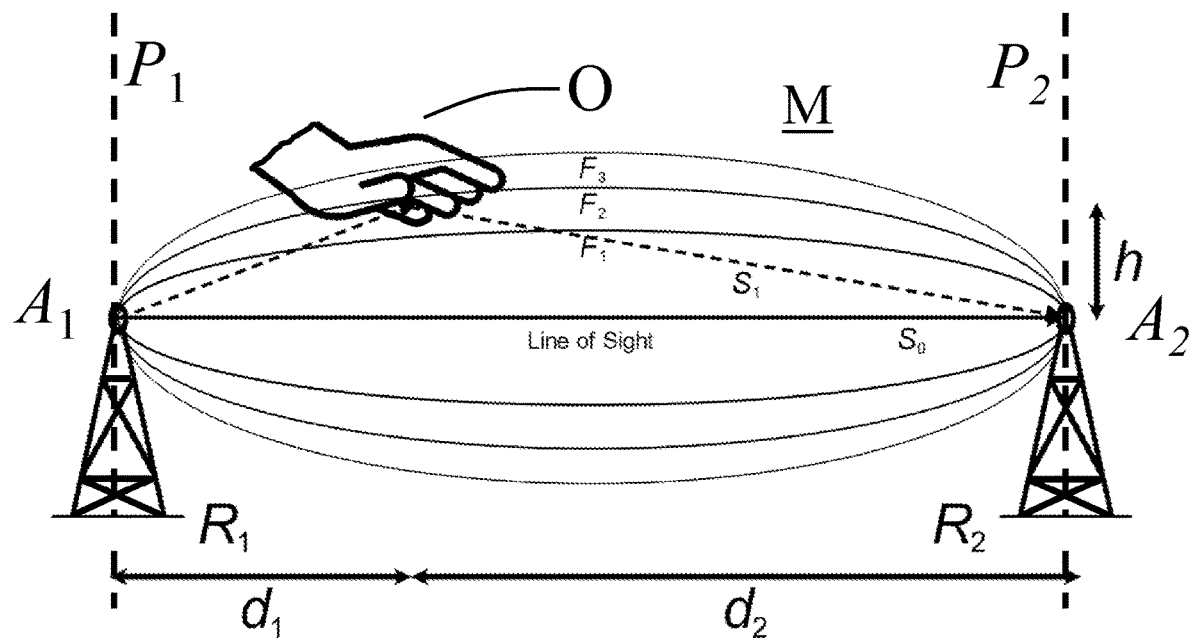
FIG. 3 is a diagram illustrating an example of a user-created multipath disturbance to the RF waves within the illustrated Fresnel zones.

Turning now to the drawings, FIG. 1 illustrates an example pairing method 100 of the present disclosure for pairing wireless devices with one another, such as, for example, first and second wireless devices $R_1$ and $R_2$ as depicted in FIGS. 2 and 3. It is noted that this example involves pairing "first" and "second" wireless devices with one another. In this usage, the terms "first" and "second" are used solely for convenience in distinguishing one wireless device from the other for explanation of the example pairing method 100. Importantly, the terms "first" and "second" do not necessarily denote that one wireless device has a dominance relative to another wireless device nor that one wireless device participates temporally in the example pairing method 100 in any particular order other than the specific operations recited in the example pairing method 100.

As seen in FIG. 1, at block 105 the example pairing method 100 has the first wireless device performing a pairing process. While block 105 describes only processes that the first wireless device performs, the second wireless device can, and typically will, perform the same or similar processes. In this manner, the first and second wireless devices can independently determine that the other wireless device is a trusted device. This two-way authentication can avoid the possibility of one of the devices mistakenly trusting an eavesdropping wireless device. This is discussed in more detail below in connection with the example pairing protocol 400 of FIG. 4.

In some embodiments, the pairing process of the block 105 may begin automatically. For example, the first and/or second wireless devices may continuously be, or continually be placed, in a pairing mode. However, automatic pairing can be detrimental in terms of power consumption, which is especially important for battery-powered wireless devices. In some embodiments, one or each of the first and second wireless devices may have a user-actuated control, such as a hardware button or a software button, among others, that allows the user to intentionally place the wireless device into an appropriate pairing mode. In such embodiments, pairing method 100 may include at an optional block 110 at which a user triggers one or both of the first and second wireless devices to enter a pairing mode, such as by actuating a user-actuated control on one or both of the first and second wireless devices. Those skilled in the art will readily understand the processes involved with triggering a wireless device to enter a pairing mode and causing the corresponding wireless device to enter its pairing mode, as these steps are ubiquitous in the art. When each of the first and second wireless devices are properly in their pairing modes, the pairing method of block 105 may proceed.

At block 105A of the pairing process of block 105, the first wireless device wirelessly transmits a "send signal" during a time period, and at block 105B the first wireless device wirelessly receives a "receive signal" during the same time period. As alluded to above, the wireless transmitting of the send signal and the wireless receiving of the receive signal may be performed in accordance with any suitable wireless communications protocol standard, such as any one of the wireless communications protocol standards listed above, among others. In the overall context of the pairing process, the second wireless device receives the send signal transmitted from the first wireless device and processes it in the same or similar manner that the first wireless device processes a second send signal that the second wireless device sends to the first wireless device as the noted receive signal during the same time period. From the perspective of the first wireless device, this second send signal is denoted as the "receive signal" herein and in the appended claims.

The "time period" noted above denotes the period of time over which both of the first and second devices determine corresponding respective signal-strength-pattern information about the signals they receive from one another. This is so because, effectively, it is the two sets of signal-strength-pattern information about two received signals that are compared with one another to determine whether or not they substantially match one another. When the two received signals substantially match one another, then one, the other, or both of the first and second wireless devices determine that the other one of the first and second wireless devices is a trusted device.

In some embodiments, the ability to determine whether or not another wireless device, here, the second wireless device from the perspective of the first wireless device, can be trusted is based upon particular properties of RF waves transmitted between two wireless devices when the two devices are located physically proximate to one another. Specifically, when two wireless devices, such as the first and second wireless devices, are located proximate to one another, not only do the signals received from one another experience extrema in the received signal strength (e.g., as represented by a received signal strength indicator (RSSI) or other signal strength value) due to local disturbances, but the patterns of the extrema in the two received signals substantially match one another. In some embodiments, the term "proximate to" in the context of physical location as between a pair of wireless devices, such as the first and second wireless devices in the context of the method 100 of FIG. 1 and as used herein and in the appended claims, shall mean that the transmitting and receiving antennas of the differing wireless devices are physically spaced apart by less than 1 meter, or less than 3 meters, or less than 5 meters, for example.

When an RF transmitter, here, $R_1$ (FIGS. 2 and 3) (e.g., the first wireless device, above, in a transmitting mode), broadcasts a frame to an RF receiver, here, $R_2$ (FIGS. 2 and 3) (e.g., the second wireless device, above), the signal may take multiple propagation paths to reach the receiver. Such a phenomenon is called "multipath." Nearby objects and surfaces act as point reflectors, creating additional signal paths between the transmitter $R_1$ and the receiver $R_2$. When multipath signals combine at receiver $R_2$, they add up constructively and/or destructively and cause the total received signal to increase and/or decrease in strength.

The precise location of a reflector, the length of the reflected signal path, and the wavelength, $\lambda$, have a direct impact on the strength of the received signal. Fresnel zones are imaginary confocal ellipsoids formed between a transmitter and a receiver that describe how the phase of a reflected signal changes. An object located along the border of the $n^{th}$ Fresnel zone will reflect a signal, causing its phase to shift by $n(\lambda/2)$ compared to the line-of-sight signal. Accordingly, the radius, $r_n$, of each Fresnel zone is calculated to achieve this effect. Let $d=d_1+d_2$, where d is the total (fixed) distance between $R_1$ and $R_2$, $d_1$ and $d_2$ are distances from $R_1$ and $R_2$, respectively, to a point along the horizontal between the two radios. Let ($d_1$, $d_2$) denote a position along the horizontal between the two radios. As shown in FIG. 2, the radius of the $n^{th}$ Fresnel zone, $F_n$, at ($d_1$, $d_2$) is given by:

$$r_n(d_1, d_2) = \sqrt{\frac{n\lambda d_1 d_2}{d_1 + d_2}} \quad \text{(Eqn. 1)}$$

Since d is fixed, $r_n(d_1, d_2)$ is maximal for a given n when $d_1 = d_2$. Hence, the radius of the $n^{th}$ Fresnel zone $F_n$ is largest at the halfway point between $R_1$ and $R_2$. By contrast, if $d_1 = 0$ or $d_2 = 0$, $r_n(d_1, d_2) = 0$. Thus, the radius goes to zero approaching either of the radios. Sketching the radii at each position ($d_1$, $d_2$) along the line of sight, ellipsoids with $r_n \propto \sqrt{n}$ are obtained, as shown in FIG. 2.

Suppose a user places an object, O (such as their hand), at some position ($d_1$, $d_2$) between $R_1$ and $R_2$, at a height h above the radios, as shown in FIG. 3. The object O acts as a point reflector and causes multipath propagation of the signal from $R_1$ to $R_2$. One component of the signal, denoted $S_0$, travels along the line-of-sight path from $R_1$ to $R_2$. Another component of the signal, denoted $S_1$, travels from $R_1$ to the hand, reflects off the hand, and then travels to $R_2$.

Because $S_1$ travels to the hand before traveling to $R_2$, its path length is longer than that of $S_0$. From the geometry of FIG. 3, the reflected signal path length, $l_r$, is given by:

$$l_r = \sqrt{d_1^2 + h^2} + \sqrt{d_2^2 + h^2} \quad \text{(Eqn. 2)}$$

The excess path length, $\Delta l$, is the difference between the length of the reflected signal path $l_r$ and the length of the direct (line-of-sight) signal path $l_d$. Accordingly, $\Delta l$ is given by:

$$\Delta l = l_r - l_d \quad \text{(Eqn. 3)}$$

$$= \sqrt{d_1^2 + h^2} + \sqrt{d_2^2 + h^2} - (d_1 + d_2)$$

$$= \sqrt{d_1^2 \left(1 + \frac{h^2}{d_1^2}\right)} + \sqrt{d_2^2 \left(1 + \frac{h^2}{d_2^2}\right)} - (d_1 + d_2)$$

$$= d_1 \sqrt{1 + \left(\frac{h}{d_1}\right)^2} + d_2 \sqrt{1 + \left(\frac{h}{d_2}\right)^2} - (d_1 + d_2)$$

If it is assumed that $h << d_1, d_2$, then $$\left(\frac{h}{d_1}\right)^2 \text{ and } \left(\frac{h}{d_2}\right)^2$$

are small. As a result, Equation 3 for $\Delta l$ can be simplified using a binomial approximation as follows:

$$\Delta l \approx d_1 \left(1 + \frac{1}{2}\left(\frac{h}{d_1}\right)^2\right) + d_2 \left(1 + \frac{1}{2}\left(\frac{h}{d_1}\right)^2\right) - (d_1 + d_2) \quad \text{(Eqn. 4)}$$

$$= d_1 + \frac{h^2}{2}\frac{1}{d_1} + d_2 + \frac{h^2}{2}\frac{1}{d_2} - (d_1 + d_2)$$

$$= \frac{h^2}{2}\left(\frac{1}{d_1} + \frac{1}{d_2}\right)$$

$$= \frac{h^2}{2}\left(\frac{d_1 + d_2}{d_1 d_2}\right)$$

Using Equation 4, the phase difference, $\Delta\phi$, between the direct and reflected signals is given by:

$$\Delta\phi = \frac{2\pi}{\lambda}\Delta l + \pi = \frac{2\pi}{\lambda}\frac{h^2}{2}\left(\frac{d_1 + d_2}{d_1 d_2}\right) + \pi \quad \text{(Eqn. 5)}$$

Note that the $\pi$ term in Equation 5 represents the phase shift of $\pi$ radians that occurs when a radio wave reflects off of a surface, such as a surface of object O. Equations 1 and 5 can be used to demonstrate that received signal strength extrema exist and that wireless device proximity establishes trust. If the object O positioned at ($d_1$, $d_2$) is precisely at a height, h, equal to the radius of the $n^{th}$ Fresnel zone $F_n$, then the phase difference $\Delta\phi$ of the reflected signal is given by:

$$\Delta\phi = \frac{2\pi}{\lambda}\frac{r_n^2}{2}\left(\frac{d_1 + d_2}{d_1 d_2}\right) + \pi \quad \text{(Eqn. 6)}$$

$$= \frac{\pi}{\lambda}\left(\sqrt{\frac{n\lambda d_1 d_2}{d_1 + d_2}}\right)^2 \left(\frac{d_1 + d_2}{d_1 d_2}\right) + \pi$$

$$= n\pi + \pi$$

$$= (n + 1)\pi$$

Observe that if n is odd, then $\Delta\phi$ is an even multiple of $\pi$ radians. As a result, the reflected signal arrives in-phase with the line-of-sight signal, and the two add constructively. This causes a large increase in the received signal strength when $R_2$ measures the received signal from $R_1$. If n is even, then $\Delta\phi$ is an odd multiple of $\pi$ radians. This gives the opposite effect, where the reflected signal arrives completely out-of-phase with the line-of-sight signal, and the two add destructively. This causes a large decrease in the received signal strength when $R_2$ measures the received signal. It is important to note, however, that even if the signals arrive in-phase ($2\pi$ radians apart) or completely out-of-phase ($\pi$ radians apart), then the received signal neither doubles in amplitude nor vanishes completely. This is a consequence of the Friis transmission model, which states that:

$$P_r = P_t G_t G_r \left(\frac{\lambda}{4\pi l}\right)^2 \quad \text{(Eqn. 7)}$$

wherein $P_r$ is the power at the receiving antenna, $P_t$ is the power transmitted, $G_t$ is the gain of the transmitting antenna, $G_r$ is the gain of the receiving antenna, and l is the length of the signal path. (The standard Friis transmission model uses the distance between radio antennas d in place of path length 1. Since the resulting power at the receiver is determined by how far the signal has to travel, l is used instead.) Observe that the power of the received signal decreases with the square of path length. Since the path length of the reflected signal is always longer than the direct path length (as shown in FIG. 3), the reflected signal will always have a smaller amplitude compared to the direct signal (assuming there are no obstacles in the line-of-sight path). As a result, the superposition of the multipath signals, regardless of the phase difference between them, will not cause an exact doubling of the received signal strength or complete vanishing of the signal.

As a user moves the object O, it breaks through different Fresnel zones. This action creates a unique received signal-strength pattern in the received frames depending on how the user moves the object O (and/or $R_1$ and $R_2$ are moved relative to the object), with certain frames having higher or lower received signal strength than others. As demonstrated, any time the object O approaches the radius of a Fresnel zone, the phase shift of the reflected signal will cause a received frame to have a relatively extreme received signal strength. In some embodiments, these are the extrema used to generate information about the pattern of the received signal strength as the received signal strength changes as the user is moving the object O (and/or $R_1$ and $R_2$ are moved relative to the object).

It is noted that more than one object O can be used and that if more than one object is used, then the objects can be moved so as to have a common velocity vector or so as to have differing velocity vectors. For the sake of convenience, the term "object" as used herein and in the appended claims shall include both a single object and multiple objects unless explicitly noted otherwise. In some embodiments, a region M in which a user moves the object O may be bounded by a pair of planes $P_1$ and $P_2$ passing through the antennas $A_1$ and $A_2$ of, respectively $R_1$ and $R_2$, and perpendicular to the line of sight between the two antennas.

Importantly, the received signal strength approach only applies if $d_1$ and $d_2$ are small, such that the wireless devices are located physically close to one another, for example, within about one meter of one another. To illustrate, suppose the wireless devices are placed far apart. As indicated by Equation 1, as the distance between radios increases, so does $r_n$. Hence, the object O will likely only break through a single Fresnel zone $F_n$ while moving. Accordingly, the received signal strength will not vary much, and neither wireless device (e.g., $R_1$ and $R_2$) will have clear received-signal-strength extrema. In this case, the extrema that each wireless device uses to determine received signal-strength-pattern information are likely the result of noise instead of hand motion. Since signal noise varies between the two wireless devices, their received signal-strength patterns should differ, and the wireless devices will be unable to authenticate one another.

This property of Fresnel zones $F_n$ allows the to-be-paired wireless devices to leverage their physical proximity as a basis for trust. If the devices are physically proximate to one another, the user breaks through multiple Fresnel zones $F_n$ as they move the object O or move the wireless devices relative to the object, or both. Executed properly, this movement provides sufficient variation and extrema in the received signal strength and, therefore, allows each wireless device to generate received signal-strength-pattern information that matches, or substantially matches, against the received signal-strength-pattern information of the other wireless device.

In practice, the sets of received signal-strength-pattern information do not necessarily need to match perfectly to effect a decision of trust. Consequently, as used herein and in the appended claims the terms "substantially matches", "substantially matching", "substantially match", and like terms, means that the sets of received signal-strength-pattern information matches to a degree that a skilled artisan deems close enough to an exact match to identify the other wireless device as a trusted device. Those skilled in the art will readily understand that the metes and bounds of "substantially matching" will vary depending on the received signal-strength-pattern information being compared. For example, in an example described below, a substantial match may be determined through a process of flipping bits according to a desired error-correction routine. Other processes of determining whether or not sets of received signal-strength-pattern information substantially matches include, but are not limited to machine learning or statistical pattern matching, function approximation algorithms, and error correction code (ECC) techniques such as Reed-Solomon coding or Viterbi decoding, among others. For the sake of simplicity, an exact match is a subset of a substantial match.

The Fresnel-zone approach described above suggests that the two wireless devices in proximity to one another should record extrema in their received signal-strength patterns. It does not, however, explain that the wireless devices should have the same received signal-strength patterns and extrema. However, the property of coherence time can explain why this is the case.

A channel is "coherent" if it is stable over a particular time period. If the time to exchange a frame, $\Delta t$, is much faster than the time it takes a user to, for example, move the object O a distance of $$\frac{1}{4}\lambda,$$

then the coherence time $T_C$ of the channel is likely greater than $\Delta t$. Hence, the channel should be stable.

If the channel is stable, then the signals sent from $R_1$ to $R_2$ and $R_2$ to $R_1$ have reciprocity. Reciprocity states that signals experience the same phase shifts and attenuation (amplitude changes) in both directions of the link. It follows that $R_1$ and $R_2$ should develop the same received signal-strength pattern (aside from noise) over the course of exchanging frames, assuming a user does not move their hand faster than:

$$v = \frac{\frac{1}{4}\lambda}{\Delta t} \tag{Eqn. 8}$$

wherein v is the maximum speed at which a user can, for example, move the object O while maintaining a stable channel.

With the foregoing principles in mind and referring back to pairing method 100 of FIG. 1, with the first wireless device having received the receive signal at block 105B, at block 105C of the pairing process 105 the first wireless device generates first signal-strength pattern information regarding a first signal-strength pattern of the received signal that the first wireless device received at block 105B. The first signal-strength pattern is the actual pattern of the receive signal that the first wireless device receives. The first signal-strength-pattern information is any information that represents the first signal-strength pattern. Examples of signal-strength-pattern information that can be used for the first signal-strength-pattern information include but are not limited to, a normalized digitization of the first signal-strength pattern, a binary-string representation of one or more characteristics, such as extrema, of the first signal-strength pattern, an authentication key built using the first signal-strength pattern, a hash value based on the signal-strength pattern, such as a hash value of an authentication key, among other things. As a particular example, a common method is to calculate deciles in the RSSI. Anything in the top 2 deciles represents a "1" bit, and anything in the bottom 2 deciles represents a "0" bit. As another example, a mean and standard deviation of RSSI values can be calculated. Any RSSI value over some threshold, say 1.5 standard deviations away from the mean, is assigned a "1" bit if higher than the mean or a "0" bit if 1.5 standard deviations lower than the mean. Those skilled in the art will understand the variety of forms that the first signal-strength-pattern information can take and that the foregoing examples are merely illustrative and nonlimiting.

In addition, it is noted that each of the first and second signal-strength-pattern information is unique in that the signal-strength pattern of each of the corresponding received signal sequences is intentionally user-induced under the specific conditions of the Fresnel-zone multipath propagation disturbance model discussed above. Thus, the nature and character of both the signal-strength pattern and the corresponding signal-strength-pattern information are distinguishable from conventional signal-strength patterns and signal-strength-pattern information by virtue of how the signal-strength patterns of the pairing process 105 of FIG. 1 are produced, specifically, by intentionally user-induced multipath disturbances to the propagation of RF signals passing between wireless devices during a time period during a pairing session between two legitimate wireless devices.

At block 105D the first wireless device wirelessly receives second signal-strength-pattern information from the second wireless device. The second signal-strength-pattern information regards the signal-strength pattern of the send signal that the first wireless device sent in step 105A, above, as determined by the second wireless device. Typically, the form and format of the second signal-strength-pattern information are the same as the form and format of the first signal-strength-pattern information so that they can be readily compared with one another without any additional processing to convert one set of form and format into the form and format needed for the comparison. However, in some embodiments, the form and format of the first and second signal-strength-pattern information may differ such that additional processing may be needed. In addition, even if the form and format of the first and second signal-strength-pattern information are the same, additional processing may be required for performing a comparison. For example, the second signal-strength-pattern information may be encrypted, and, therefore, the first wireless device may need decrypted before proceeding with the pairing process 105.

At block 105E, after receiving the second signal-strength-pattern information from the second wireless device, the first wireless device determines whether or not the first and second signal-strength-pattern information substantially match one another. As a reminder, the meaning of "substantially match" in this context is addressed above and exemplified below, for example, in connection with block 445 of example pairing protocol 400 of FIG. 4.

After determining that the first and second signal-strength-pattern information substantially match one another at block 105E, at block 105F the first wireless device determines that the second wireless device is a trusted device. In some embodiments, the determination of whether or not the second wireless device is a trusted device may be based solely on finding a substantial match between the first and second signal-strength-pattern information. In some embodiments, the determination of whether or not the second wireless device is a trusted device may be augmented by the first wireless device assessing additional information. For example, the first wireless device may assess the strength of the signal by which it received the second signal-strength-pattern information. If the signal strength is too low, then the first wireless device may determine that an adversarial wireless device that is too far away sent second signal-strength-pattern information and abort the pairing process 105. If the signal strength is too high, then the first wireless device may determine that an adversarial wireless device that is overpowered sent the second signal-strength-pattern information and therefore abort the pairing process 105.

As noted above, the pairing method 100 may include a number of optional processes. As already discussed, optional block 110 involves the first wireless device receiving a user input for initiating the pairing process 105. In some embodiments, the user may also affirmatively cause the second wireless device to enter a pairing mode, as well.

At optional block 115, instructions may be provided to the user on how to perform the pairing. These instructions may include, among other things, any one or more of the following instructions: how far apart to place the first and second wireless devices relative to one another for the pairing process; to make sure the first and second wireless devices remain stationary during the pairing process; how to put one or both of the first and second devices into pairing mode; when, where, and how to cause disturbances to the propagation of signals transmitted between the first and second wireless devices during the time period, and/or how long to cause the disturbances; and what to do if pairing is unsuccessful, among others. Depending on the capabilities of the first and second wireless devices, one or the other, or both, of the first and second wireless devices may provide the instructions to a user, for example, via a graphical display or an aural display, or a combination of the two. In some embodiments, the instructions may be provided in another manner, such as, but not limited to, on printed material accompanying at least one of the first and second wireless devices upon purchase, on a web page of a manufacturer of either or both of the first and second wireless devices, and/or in an online demonstration video, among others.

After determining at block 105F that the second wireless device is a trusted device, at optional block 120 the first wireless device may work with the second wireless device to bootstrap a secure communications channel. Those skilled in the art will readily understand the relevant bootstrapping process, which may depend on the data communications protocol used by the first and second wireless devices. After determining at block 105F that the second wireless device is a trusted device, at optional block 125 the first wireless device may register the second wireless device as a trusted device for future communications. For example, the first wireless device may receive a hash of the media access control (MAC) address of the second wireless device or other cryptographic key from the second wireless device over the now-established secure communications channel and store that information in a lookup table for future encounters with the second wireless device.

Those skilled in the art will readily appreciate that the foregoing steps of pairing method 100 of FIG. 1 need only be performed in the recited order if the process(es) of a subsequent step must necessarily be proceeded by another step. Otherwise, the execution of the various blocks of method 100 may be performed in any other logical order.

ILLUSTRATIVE EXAMPLES

Example Pairing Protocol

Figure 4:
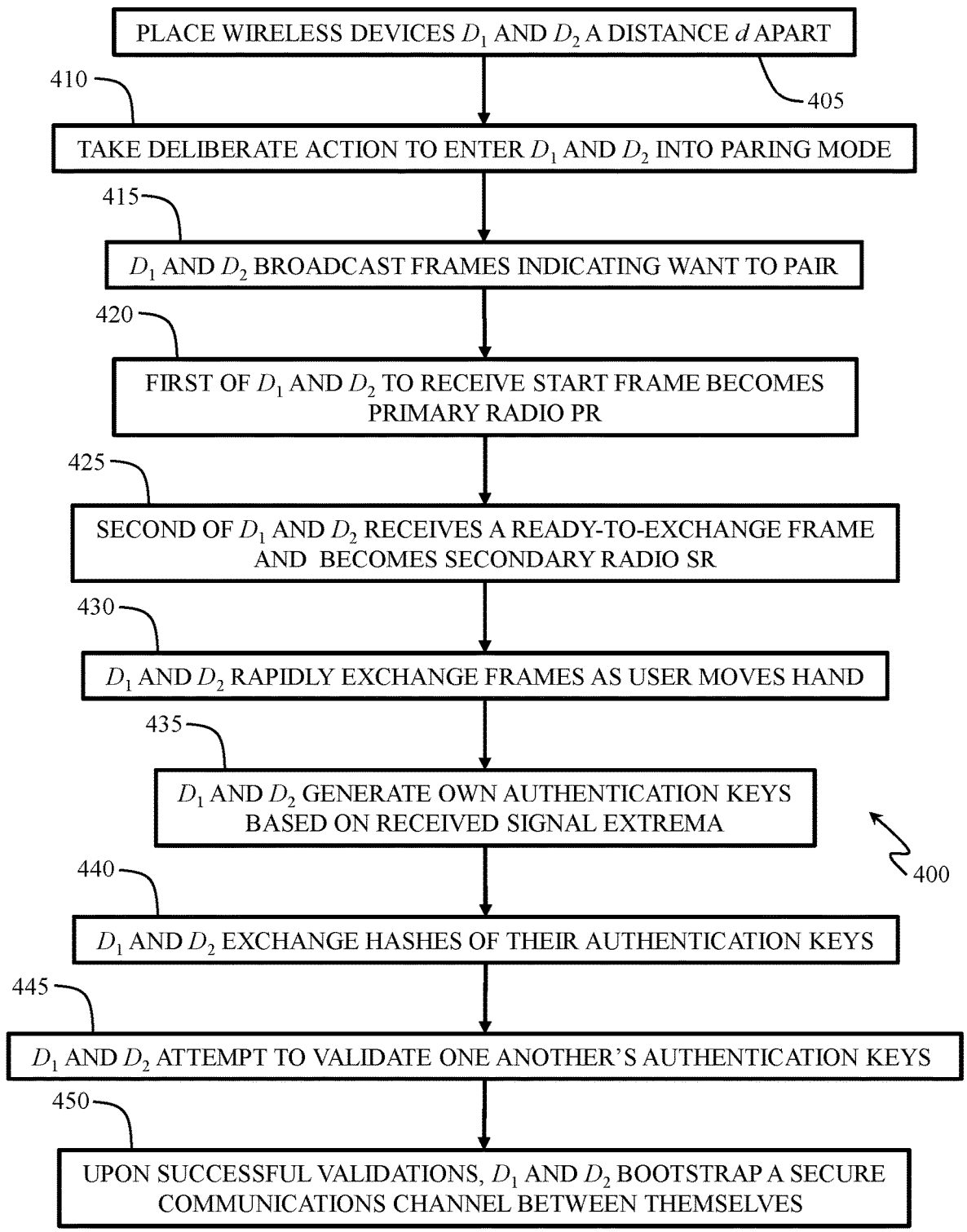
FIG. 4 is a flow diagram illustrating an example pairing protocol based on intentionally creating multipath Fresnel-zone propagation disturbances.

With the foregoing generalities and example Fresnel-zone multipath propagation disturbance model in mind, FIG. 4 illustrates an example pairing protocol 400 in which a pair of wireless devices remain still during the pairing process and a user waves an object, here, one of their hands, to create the Fresnel-zone propagation disturbance that causes the extrema in the received signal(s) used to determine whether or not to trust the corresponding sending wireless device. Those skilled in the art will readily understand that pairing protocols other than pairing protocol 400 of FIG. 4 can be formulated under the general principles discussed above in connection with pairing method 100 of FIG. 1 and the Fresnel-zone-based propagation disturbance model discussed above in connection with FIGS. 2 and 3.

Figure 5:
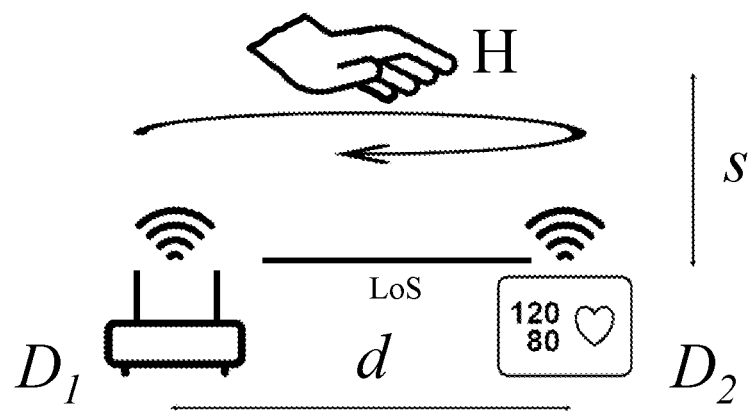
FIG. 5 is a diagram illustrating aspects of the example pairing protocol of FIG. 4.

Referring now to FIG. 4, and also to FIG. 5 for example physical aspects of the pairing protocol of FIG. 4, at block 405 the user places a pair of wireless devices, $D_1$ and $D_2$, that they want to pair together a distance d apart from one another. It is noted that each of $D_1$ and $D_2$ includes a radio, corresponding respectively to radios $R_1$ and $R_2$ discussed above, involved in the pairing protocol. In one example, the user places $D_1$ and $D_2$ in a range of 25 cm to 50 cm (~10 inches to ~20 inches) apart, for example, in accordance with instructions that the user has previously received.

At block 410 the user takes a deliberate action to enter $D_1$ and $D_2$ into a Fresnel-zone multipath propagation disturbance pairing mode. When either or both of $D_1$ and $D_2$ has/have a limited user interface (e.g., blood-pressure monitors and toothbrushes), this can involve, for example, pressing a button on one or both of the wireless devices. When either of $D_1$ and $D_2$ has a rich user interface (e.g., smartphones and computers), this can involve, for example, selecting a soft button displayed on an electronic display. These are simply illustrative examples of deliberate actions a user can take to intentionally initiate the Fresnel-zone multipath propagation disturbance pairing mode. Those skilled in the art will readily appreciate that many other deliberate actions and corresponding initiation means can be devised. As noted above, in some embodiments deliberate action of a user is not required to put one or the other, or both, of $D_1$ and $D_2$ into pairing mode. In such embodiments, $D_1$ and/or $D_2$ may always be broadcasting readiness to pair and listening for such a broadcast. Consequently, in some embodiments, block 410 may be modified accordingly or eliminated altogether.

At block 415, in response to being placed into the Fresnel-zone multipath propagation disturbance pairing mode, each of $D_1$ and $D_2$ broadcast start frames indicating that they are ready to pair. Each of $D_1$ and $D_2$ continue broadcasting start frames until they receive a response from another wireless device looking to pair. The pairing-initiation protocol may be any suitable pairing-initiation protocol, including any of such protocol established under the relevant underlying communications standard being used, such as a Bluetooth® standard, WiFi® standard, Zigbee standard, etc.

At block 420 the first one of $D_1$ and $D_2$ to receive a start frame from another wireless device becomes the primary radio, PR. In an example, say $D_1$ receives a start frame from $D_2$. In response, $D_1$ stops sending start frames and instead broadcasts a ready-to-exchange frame. As the PR in this example, $D_1$ serves as the leader of a subsequent frame-exchanging process between $D_1$ and $D_2$, as discussed below, and ensures that frame trading remains synchronized.

At block 425 the second of $D_1$ and $D_2$ receives a ready-to-exchange frame and becomes the secondary radio, SR. In an example, say $D_2$ receives a ready-to-exchange frame from $D_1$. In response, $D_1$ responds with a ready-to-exchange frame of its own. As the SR in this example, $D_2$ acts as a follower and responds to the frames that $D_1$ (PR) sends. Other methods such as Secure Multi-party Communications techniques could also be used to pick the PR.

At block 430 $D_1$ and $D_2$ rapidly exchange frames while the user waves or otherwise moves their hand, H (corresponding to object O in FIG. 3), at a spacing s perpendicular to the line of sight, LoS, (e.g., above) between the antennas of the two wireless devices so that their hand O, or portion(s) thereof, crosses borders between Fresnel zones (see, e.g., FIG. 3).

In some embodiments, $D_1$ and $D_2$ exchange frames as quickly as possible. In this example, each frame that $D_1$ and $D_2$ exchange is indexed, with its index (here, a number) included in the payload of the frame. Indexing is used to help $D_1$ synchronize the exchange as the PR. If $D_2$ fails to respond within a short time window (possibly because the frame was dropped), $D_1$ may resend a new frame with the same index one or more times, for example, three times. If $D_2$ fails to respond after the last (e.g., third) resend, $D_1$ deduces that $D_2$ has stopped trying to pair and also terminates pairing. In other embodiments, devices do not wait to receive frames from the other, but simply transmit as fast as they are capable.

In this example, indexing is also used in an example authentication-key-based process to make authentication key validation easier, as described below. In an example of intentionally creating a disturbance in the propagation of the signals being transmitted between $D_1$ and $D_2$ and carrying the indexed frames, the user moves their hand H for about 15-25 seconds during the frame-trading interval. In a particular example, for best results, the user waves their hand H at a spacing s=10 cm to 20 cm (~4 inches to ~8 inches) from the line of sight LoS between the antennas of $D_1$ and $D_2$, as shown in FIG. 5.

Figure 6:
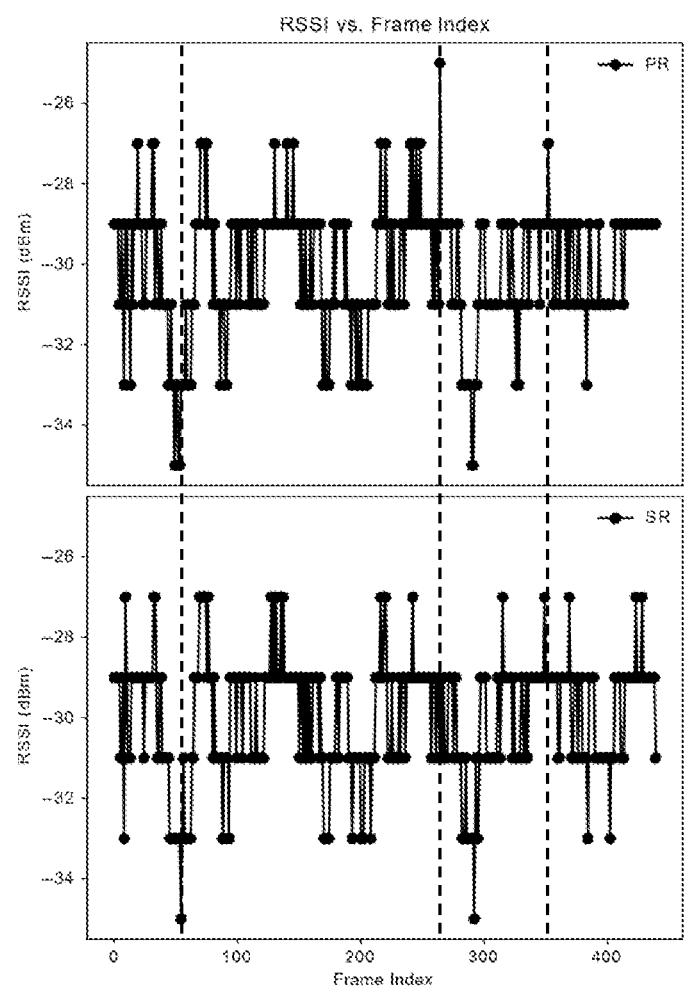
FIG. 6 is a pair of stacked-graphs, each of received signal strength indicator (RSSI) versus frame index for frames received by a corresponding one of the wireless devices $D_1$ and $D_2$ (primary radio (PR) and secondary radio (SR), respectively) during a sample pairing session using the example pairing protocol of FIG. 4.

At block 435 $D_1$ and $D_2$ each generate an authentication key based on extrema of the received signal strength of the frames that each receives. In an example, each of $D_1$ and $D_2$ identifies a number m of extrema in their recorded RSSI. (In an example implementation, m=24 extrema. This is discussed below in more detail.) FIG. 6 shows RSSI patterns recorded by the PR and the SR during a sample pairing session using the example pairing protocol 400 of FIG. 4. As shown in FIG. 6, each of $D_1$ and $D_2$ records extreme RSSI values because these wireless devices are nearby one another (as the Fresnel-zone theory suggests). To find extrema, in an example, each of $D_1$ and $D_2$ computes a mean RSSI value of all received frames and compares each frame's RSSI value to the mean RSSI value. The m frames with the greatest absolute difference between a frame RSSI value and the mean RSSI values are taken as the extrema.

In an example of generating signal-strength pattern information, from the extrema each of $D_1$ and $D_2$ forms an authentication key as a binary string. Each of $D_1$ and $D_2$ maps the extrema having frame RSSI values greater than the mean RSSI value (maxima) to binary "1" and maps the extrema having frame RSSI values less than the mean RSSI value (minima) to binary "0". The order of 1s and 0s corresponds to the index order of the extrema frames. Formally, let $i_k$ denote the index of the $k^{th}$ extrema frame such that:

$$i_1 < i_2 < \ldots < i_k < \ldots < i_m \quad \text{(Eqn. 9)}$$

Using the indexing order given in Equation 9, the authentication key $K_A$ is given by:

$$K_A = bi_1, bi_2, \ldots, bi_k, \ldots, bi_m \quad \text{(Eqn. 10)}$$

wherein:

$$b_{i_k} = \begin{cases} 1 & \text{if frame } i_k \text{ has an } RSSI \text{ maximum} \\ 0 & \text{if frame } i_k \text{ has an } RSSI \text{ minimum.} \end{cases}$$

At block 440 $D_1$ and $D_2$ exchange hashes of their authentication keys and the frame indices used to build the authentication keys. Any suitable hashing function, such as bcrypt, can be used. In some embodiments, it can be desirable for the hash function to be slow, such as is the case with bcrypt, to prevent an adversary from hashing all possible combinations to recover the key. As another example, in some embodiments a one-time nonce can be appended to an authentication key followed by a hashing of the combination of the authentication key and the nonce and a sending of the resulting hash. In this example, adding a nonce increases the number of possible hashes that an adversary would need to pre-compute and, thereby, increases the amount of time to find a solution. Ideally, the solution time will be greater than the time it would take for $D_1$ and $D_2$ to complete pairing.

At block 445 $D_1$ and $D_2$ attempt to validate one another's authentication keys. If $D_1$ and $D_2$ are in proximity to one another, they should have similar signal-strength patterns during the time period that included the user waiving their hand O as discussed above, for example, in connection with block 430. In an example, each of $D_1$ and $D_2$ computes a second key $K_B$ using its own RSSI pattern and the indices $\{i_1, i_2, \ldots, i_k, \ldots, i_m\}$ provided by the other one of $D_1$ and $D_2$. If the RSSI patterns are similar, then the extrema should be comparable as well. Accordingly, the relevant wireless device compares the RSSI value of each frame k to its mean RSSI value to build $K_B$. In this example, when the relevant wireless device ($D_1$ or $D_2$) determines that the RSSI of frame k is greater than the mean RSSI value, then this wireless device maps frame k to a binary "1". Otherwise, the wireless device maps frame k to binary "0". Once complete, the relevant device ($D_1$ or $D_2$) hashes $K_B$ using the same hashing function used to hash $K_A$, for example, bcrypt.

If the hash of $K_B$ determined by each of $D_1$ and $D_2$ matches the hash sent by the other one of $D_1$ and $D_2$, then that wireless device deems the other wireless device as being authentic, i.e., as a trusted device. Since RSSI patterns may not be identical (e.g., as illustrated in FIG. 6 by the dashed vertical line at frame indices where the RSSI pattern of $D_1$ ("PR" in FIG. 6) and $D_2$ ("SR" in FIG. 6) clearly differed from one another), each wireless device will perform an error-correction, or adjustment, algorithm. For example, an adjustment algorithm may include flipping up to three bits in $K_B$, rehashing, and re-comparing the rehash to the hash received at block 440. If either of $D_1$ and $D_2$ cannot match the other's authentication key when adjusting up to three incorrect bits, then the authenticity, or trustworthiness, of the other device cannot be verified, and that wireless device terminates pairing. This may happen, for example, when the devices are too far away from one another. In this case, there is not enough variation in the RSSI data that each of $D_1$ and $D_2$ records, as discussed above. Accordingly, the extrema RSSI recorded by either of $D_1$ and $D_2$ are likely due to noise and do not appear as extrema to the other of $D_1$ and $D_2$. Hence, $D_1$ and $D_2$ generate dissimilar keys and cannot authenticate one another.

At block, 450 $D_1$ and $D_2$ bootstrap a secure communications channel between themselves using a suitable bootstrapping protocol. The length of the authentication key generated and the manner of the exchange can vary depending on, for example, the wireless protocol that $D_1$ and $D_2$ operate under for the pairing and the processing speeds of $D_1$ and $D_2$. If the wireless protocol and processing speeds are fast enough to create an authentication key that is sufficiently long to make the authentication key reasonably secure without requiring the user to move their hand H for an unreasonable amount of time, the generated authentication keys themselves may be used by themselves to form a secure channel. However, in some embodiments the speed(s) of the wireless protocol and/or the processing by $D_1$ or $D_2$ can be so slow that the time it would take to generate such a sufficiently long authentication key, and hence the time the user would need to move their hand H, would be unreasonable. In such cases, the bootstrapping protocol can be modified to utilize shorter authentication keys. For example, the bootstrapping protocol could implement a Diffie-Hellman key exchange that provides good security despite using relatively short authentication keys. As those skilled in the art will readily appreciate, when a Diffie-Hellman key exchange is used, rather than each generated authentication key being the sole piece of information for determining trust, each generated authentication key augments a second piece of information, i.e., a shared secret, to provide information that the other device $D_1$, $D_2$ uses to confirm that the shared secret came from a trusted device. In the present example, the 24-bit authentication key that each of $D_1$ and $D_2$ generates is too short to be used for long-term encryption. Consequently, in this example $D_1$ and $D_2$ perform a Diffie-Hellman key exchange to form a shared symmetric key for establishing a secure communication channel. The authentication keys ensure that the Diffie-Hellman shared secret that each of $D_1$ and $D_2$ receives came from the expected device. Further details of a Diffie-Hellman key exchange are discussed below in the subsection titled "Example Secure-channel Key Exchange".

Example Implementation

A test instantiation of the pairing protocol 400 of FIG. 4 was implemented using the high-level programming language Python 3 and the Scapy packet-manipulation tool for packet crafting and sniffing. To evaluate the pairing protocol 400, Panda Ultra Wireless N USB 2.4 GHz Wi-Fi adapters were used to simulate Internet of Things (IoT) device radios. These adapters were chosen because they are comparable to the inexpensive antennas commonly used in IoT electronics. Each radio was connected via a USB extension cable to an Apple® MacBook Pro® laptop computer running the Ubuntu 20.04 operating system in a VMware® Fusion® virtual machine. Extension cables enabled quick re-positioning of radios for testing purposes.

This test instantiation demonstrated that changes to existing IoT hardware are not necessary to use the pairing protocol 400. For example, it was determined that the standard antennas already embedded in device hardware are suitable to facilitate the wireless pairing and establishing a trusted wireless channel. For existing wireless devices desired to be modified to be able to implement the pairing protocol 400, only a software update would be needed to include machine-executable instructions for performing various steps of the pairing protocol. For new wireless devices, the machine-executable instructions can be included in the operating software or firmware during manufacturing. Using the pairing method 100 of FIG. 1 and/or the pairing protocol 400 of FIG. 4, as guides, anyone skilled in the relevant art(s) can readily create those machine-executable instructions.

Example Signal-Strength Pattern Similarity

A 2.4 GHz Wi-Fi® signal has a wavelength λ of about 12 cm. Accordingly, $$\frac{1}{4}\lambda$$

is approximately 3 cm. Although the Scapy packet-manipulation tool can broadcast frames from a single device rapidly, exchanging frames was much slower. This is because each of $D_1$ and $D_2$ must wait for a response from the other one of $D_1$ and $D_2$ before sending the next frame. Testing showed that, on average, $D_1$ and $D_2$ take $\Delta t = 0.04$ s to exchange one frame between themselves. Hence, the maximum speed, v, at which a user can move their hand while maintaining signal reciprocity is:

$$v = \frac{\frac{1}{4}\lambda}{\Delta t} \approx \frac{3 \text{ cm}}{0.04 \text{ s}} = 0.75 \frac{\text{m}}{\text{s}} \quad \text{(Eqn. 11)}$$

Clearly, v is not large, and a user can easily move their hand faster than this speed. If they do, then the signals exchanged between the two radios are not guaranteed to have the same fading characteristics, and $D_1$ and $D_2$ may record different RSSI patterns. Additionally, either of $D_1$ and $D_2$ may pick up more noise in a received frame than the other one of $D_1$ and $D_2$. This can create additional inconsistency between two RSSI patterns.

To account for differences in the RSSI patterns due to the user's hand speed and noise, it was observed that RSSI patterns are likely to be similar (and not necessarily identical) over larger intervals of frames. If a user moves their hand faster than v, then $D_2$'s RSSI pattern may be shifted relative to $D_1$'s, as illustrated in FIG. 6. To counteract lost reciprocity and noise, the RSSI may be averaged over a number of frames (seven frames in the test instantiation, as determined experimentally), with extrema chosen from the averages to build authentication keys.

With this technique, minor variations in the RSSI recorded by each device would not necessarily preclude pairing from succeeding. Note that because the RSSI patterns between wireless devices may have some differences, each wireless device may identify different extrema (even with averaging) when building its authentication key. This is why each wireless device should validate its RSSI (or other signal-strength) pattern against the other wireless device's signal-strength pattern, for example, via an authentication-key process, such as the authentication-key process discussed above. The authentication keys themselves may be built using different frames, but if the wireless devices are nearby, their signal-strength patterns should be similar. As such, each wireless device should be able to build the other's authentication key using the frame indices provided.

Example Authentication Key Length

In the early stages of development of an authentication-key based instantiation, it was hypothesized that $D_1$ and $D_2$ could trade enough frames to build an encryption key directly from the RSSI extrema. However, it was found that this was not possible in the test instantiation without creating a poor user experience.

As noted previously, trading frames with the Scapy tool is slow. It took about 15 seconds to 25 seconds for the two wireless devices ($D_1$, $D_2$) to trade 440 frames, from which m=24 extrema could be reliably extracted to build an authentication key. To generate enough RSSI data to build a secure 128-bit symmetric key, a user would have to wave their hand for about two minutes. Since in some embodiments a goal of a pairing method of the present disclosure, such as pairing method 100 of FIG. 1 and pairing method 400 of FIG. 4, is to be fast and easy for setting up many devices, such an implementation does not align with this goal.

The limited RSSI data, however, can be used for the express purpose of authentication, as noted above in the subsection "Example Signal-strength Pattern Similarity". This enables the two devices to perform an authenticated Diffie-Hellman key exchange in order to form a long symmetric key.

Example Secure-Channel Key Exchange for "Short" Generated Authentication Keys To generate a long symmetric key for secure communications according to the advanced encryption standard (AES) specification, the wireless devices in the test instantiation were programmed to perform a Diffie-Hellman key exchange. A default modulus p and base g were chosen to be used for all test pairing sessions using the test instantiation and the example pairing protocol 400 of FIG. 4. Here, p and g are arbitrary large prime numbers, with p>>g.

In the test instantiation, to create a secure key, $D_1$ chose a secret $1<a<p$ and $D_2$ chose a secret $1<b<p$; $D_1$ and $D_2$ shared neither a nor b. Instead, $D_1$ and $D_2$ traded modulo secrets. $D_1$ sent $A=g^a \bmod p$ to $D_2$, and $D_2$ sent $B=g^b \bmod p$ to $D_1$. Each of $D_1$ and $D_2$, using its secret and received modulo secret, computed the same symmetric key $K_{DH}$ as:

$$(g^b \bmod p)^a = g^{ba} \bmod p = K_{DH} = g^{ab} \bmod p = (g^a \bmod p)^b \quad \text{(Eqn.12)}$$

Normally, the greatest weakness of the Diffie-Hellman protocol is its inability to authenticate whether a modulo secret came from the expected sender. This can be rectified using PKI, but as noted above, most IoT devices will not have the processing power or Internet connectivity needed to verify certificates.

Instead, the test instantiation used authentication keys to verify that a modulo secret came from the expected (nearby) wireless device. When each of $D_1$ and $D_2$ sent the other one of $D_1$ and $D_2$ its authentication key hash, it also included its modulo secret AES-encrypted using the authentication key in the frame payload. Hence, if either of $D_1$ and $D_2$ was able to verify the other's authentication key, then the decrypted modulo secret was guaranteed to belong to that device. $K_{DH}$ could then be used as a long symmetric key going forward, known only to the $D_1$ and $D_2$ that the user intended to pair.

User-Selectable Maximum Pairing Distance

In the early phase of development, the underlying principles discussed above reveal that a pairing method of the present disclosure, such as pairing method 100 of FIG. 1 and pairing protocol 400 of FIG. 4, should work and that proximity can be used as a basis for trust. In this section, it is demonstrated experimentally that such a pairing method does indeed work.

It was hypothesized that the number of differing bits between the keys generated by $D_1$ and $D_2$ should increase with distance. In other words, as $D_1$ and $D_2$ are moved farther apart, they should record less RSSI variation from the user's hand motion, and the likelihood that they can each generate the other's authentication key should decrease. Thus, the farther away $D_1$ and $D_2$ are from one another, the less easily they should be able to pair. To test this hypothesis, a Panda USB Wi-Fi® adapter was attached to each of two MacBook® Pro® laptops and the distance between them was increased in increments of 0.3 meters. At each distance, a total of ten trials was run. In each trial, the pairing protocol 400 of FIG. 4 was executed as normal until the frame exchange step was complete. Then, $D_1$ generated an authentication key $K_A$, sent the frame indices used to build $K_A$ and a hash of $K_A$ to $D_2$, and $D_2$ calculated $K_B$ using its own RSSI and the frame indices that $D_1$ provided. At the end of the pairing session, the number of differing bits between $K_A$ and $K_B$ were recorded in addition to the mean RSSI of the exchanged frames.

Figure 7A:
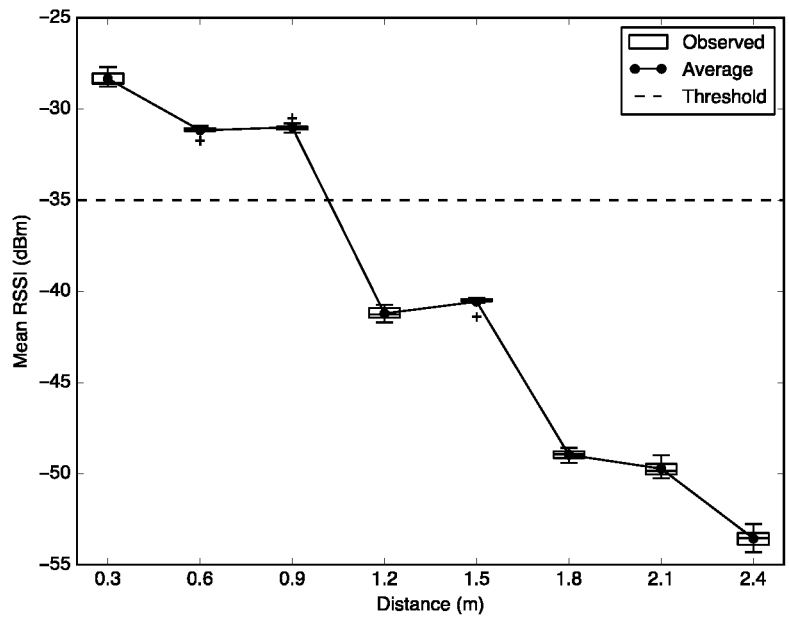
FIGS. 7A and 7B are graphs of mean RSSI versus distance for, respectively, the PR and the SR for a set of trials that used the protocol of FIG. 4.
Figure 7B:
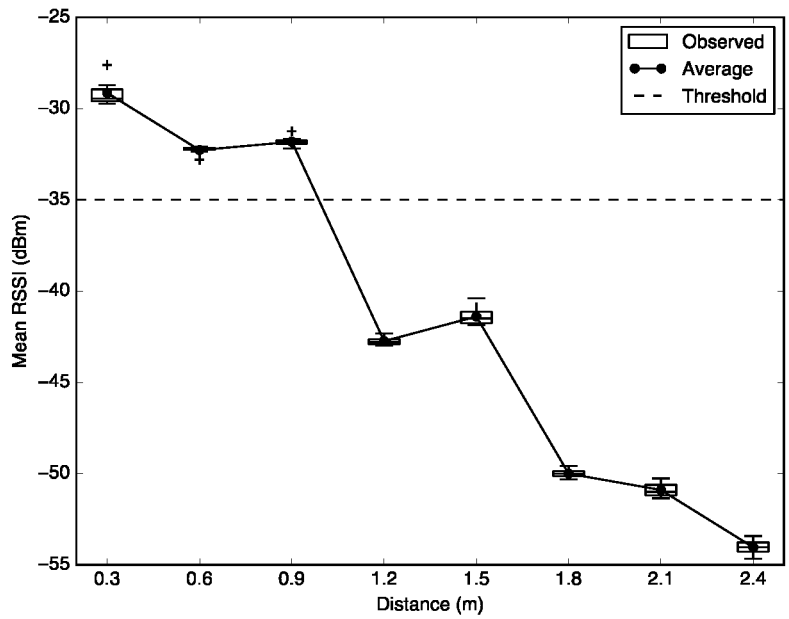

The RSSI means recorded by the radio of each of $D_1$ (PR) and $D_2$ (SR) adhere to Equation (7) as expected. These results could be used to mitigate the anomalous effects observed. As shown in FIGS. 7A and 7B, as the distance between devices increases, the path length of the transmitted signal increases, and therefore RSSI tends to decrease. It is noted that in FIGS. 7A and 7B the boxes represent the region of mean RSSI between the $25^{th}$ and $75^{th}$ percentiles, the solid line represents the median of the RSSI means, the whiskers represent the range of RSSI means, and the "+" symbols represent outliers outside the interquartile range. When $D_1$ and $D_2$ were within close range of one another (less than 1 m in this test instantiation) they consistently recorded RSSI means above −35 dBm, while when $D_1$ and $D_2$ were farther apart from one another, they recorded RSSI means below −35 dBm. Since it is desired that only wireless devices in close range of one another pair together, a threshold at −35 dBm was set in the test instantiation of the pairing protocol 400 of FIG. 4. In this test instantiation, all sniffed packets having RSSIs below the threshold were ignored. This prevented wireless devices (e.g., $D_1$ and $D_2$) with inordinately large distances between them from possibly pairing together, thereby ensuring that proximity was the basis for trust as desired. Additionally, the threshold ensured that the test instantiation of the pairing protocol 400 could be used by multiple users simultaneously in crowded spaces, like apartment buildings, for example. Even if two users in adjacent apartments are pairing devices at the same time using the test implementation of the pairing protocol, as long as the users' devices are more than one meter apart, neither user should affect the pairing session of the other user.

In some embodiments, a pairing method/protocol of the present disclosure may implement an RSSI threshold in which any sniffed packets received at an RSSI below the threshold are ignored because the transmitting device is assumed to be out of the desired pairing range, such as the 1 m distance noted in the immediately preceding paragraph. In some embodiments, the RSSI threshold may be a fixed value, such as the −35 dBm noted above, preset within the machine-executable instructions for executing the method/protocol or it may be a user-selectable value. Regarding user-selectable RSSI values, in some embodiments one or both of the devices $D_1$ and $D_2$ may be provided with a user-actuated selector, for example, either a hard or soft selector, such as a switch, radio buttons, slider, etc., that allows the user to select a desired setting. In some instantiations, the setting may be indicated by a suitable descriptor, such as relative proximity (e.g., "Near", "Far", "Close", "Distant", "Short Range", "Long Range", etc., and/or a distance value (e.g., "<1 Meter", "Up to 1 Meter", "0-3 Meters", "3 to 10 Feet", "0-5 Feet", etc. Those skilled in the art will readily appreciate that the specific RSSI threshold value(s) or RSSI threshold range will vary depending on several factors, such as the wireless protocol at issue, the power of the corresponding radios, and the actual distance(s) or actual distance range between the devices at/over which pairing is desired to be limited.

Example Wireless Device

Figure 8:
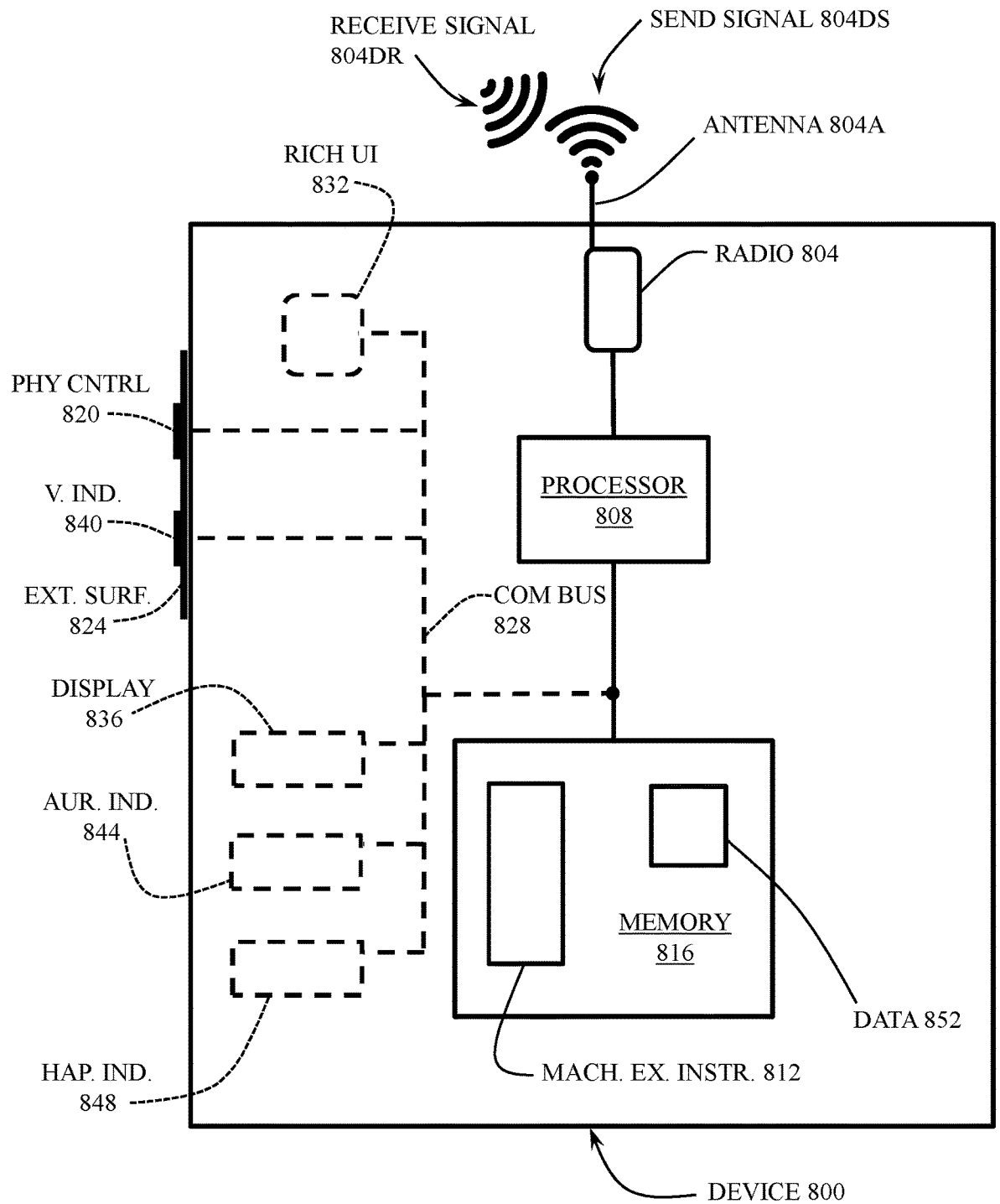
FIG. 8 is a high-level schematic/block diagram of an example wireless device configured to implement a pairing method of the present disclosure.

FIG. 8 illustrates an example wireless device 800 that has been configured to pair with one or more other wireless devices (not shown) using a pairing method of the present disclosure, such as pairing method 100 of FIG. 1 or pairing protocol 400 of FIG. 4, among others. Indeed, the wireless device 800 may be configured to implement any pairing method that has been devised to rely on fundamental principles discussed herein that rely, in part, upon using signal-strength patterns, as determined by a set of wireless devices, attempting to legitimately pair with one another, during a time period when RF propagations between the two devices are intentionally being disturbed either by a user or under the user's control. In some embodiments, the wireless device 800 can be any one of the wireless devices discussed above, including, without limitation, any of the wireless devices $D_1$, $D_2$, $R_1$, and $R_2$.

As discussed briefly above, the set of hardware required for a wireless device pairable using a pairing method of the present disclosure is minimal and generally does not require any hardware beyond hardware already part of many types of existing devices that can benefit from being modified to be capable of performing such a pairing method. This is so because, generally, all a pairing method of the present disclosure requires beyond conventional and ubiquitous hardware components, is machine-executable instructions for causing such hardware components of the device to perform corresponding aspects of the pairing method. The minimal set of hardware needed is generally a radio, memory, and one or more processors, and this hardware can be either part of an existing wireless device or part of a newly developed wireless device.

Correspondingly, example wireless device 800 includes a radio 804 (or multiple radios) having at least one antenna (only one antenna 804A being shown in FIG. 8 for simplicity). The radio 804 is configured to transmit a send signal 804DS and receive a receive signal 804DR using any suitable wireless protocol, such as any one or more of existing wireless protocols that include, but are not limited to wireless protocols under IEEE 802.11 standards (e.g., 802.11ax, 802.11ac, 802.11n, 802.11g, 802.11b, etc.), IEEE 802.15.4 standards, and IEEE 802.16 standards, among others, including wireless standard protocols such as WiFi®, Bluetooth®, BLE® (Bluetooth Low Energy), ZigBee®, and WiMax®, among others. The antenna 804A can be internal or external to the wireless device 800, depending on the particular type and/or design of the wireless device.

The example wireless device 800 also includes one or more processors (collectively illustrated and referred to hereinafter as "processor 808") that execute machine-executable instructions 812 that are operatively configured to perform one or more pairing methods of the present disclosure, such as pairing method 100 of FIG. 1 and/or pairing protocol 400 of FIG. 4, among others as mentioned above. The processor 808 may be any suitable processor, such as a microprocessor, an application specific integrated circuit, part of a system on a chip, or a field-programmable gate array, among other processor architectures.

The machine-executable instructions 812 are stored in one or more memories (collectively illustrated and referred to hereinafter as "memory 816"), which may be any suitable type(s) of machine memory, such as cache, RAM, ROM, PROM, EPROM, and/or EEPROM, among others. Machine memory can also be another type of machine memory, such as a static or removable storage disk, static or removable solid-state memory, and/or any other type of persistent hardware-based memory. Fundamentally, there is no limitation on the type(s) of memory other than it be embodied in hardware. The machine-executable instructions 812 may compose a portion of the software (e.g., firmware) of the wireless device that performs other functions about the wireless device or they may be provided as a separate software or firmware module. For the sake of simplicity, machine-executable instructions that provide the wireless device 800 with other functionality(ies) is not shown. Fundamentally, the manner in which the machine-executable instructions 812 are provided to the wireless device 800 is immaterial so long as they provide the requisite pairing functionality as described in this disclosure.

Prior to the machine-executable instructions 812 being aboard the wireless device 800, they may be stored or otherwise present on machine memory (not shown) external to the wireless device. For example, the machine-executable instructions 812 may be stored on a server or other hardware used to install the machine-executable instructions into the wireless device 800 during manufacturing or at another time. In some embodiments, the machine-executable instructions 812 may be stored on a web server and be deliverable to the memory 816 of the wireless device over the Internet and any further communications network(s) needed to complete the connection to the wireless device, such as a local-area network, cellular network, etc. In some embodiments, the machine-executable instructions may be stored on portable (e.g., removable) machine memory, such as thumb drives, external hard drives (e.g., solid state, magnetic, etc.), optical disks, etc. Fundamentally, there is no limitation on the nature of the machine memory that can be used for memory 816 aboard the wireless device 800 and the memory for storing the machine-executable instructions 812 prior to being installed into the wireless device. In all cases, such memory is referred to herein and in the appended claims as "machine memory", which is any hardware memory and specifically excludes transient signals.

In some embodiments, the wireless device 800 may include an optional physical control 820 that a user actuates to place the wireless device 800 into pairing mode. The physical control 820 may be a suitable type of control, such as a push-button switch, a slide-type switch, a magnetic switch, etc. Fundamentally, there are no limitations on the type of the physical control 820 provided, as long as it allows a user to place the wireless device into a pairing mode of the present disclosure. As discussed above in the section titled "User-selectable Maximum Pairing Distance", in some embodiments it can be useful to allow the user to select a maximum pairing distance, and consequently a corresponding RSSI threshold, for each pairing. In such embodiments, the physical control 820 can be configured and operatively connected to allow the user to set the maximum pairing distance at which the wireless device 800 will pair with another device. In other embodiments, a physical control (not shown) separate from the physical control 820 shown can be provided for this purpose.

In some embodiments, the physical control 820 may be accessible on an exterior surface 824 of the wireless device 800. The physical control 820 may be in operative communication with the processor 808 via any suitable connection architecture, such as a communications bus 828, among others. In lieu of, or in addition to the physical control 820, the wireless device 800 may include a soft control, such as a soft button, slider, etc., on a rich user interface (UI) 832, which may be implemented on an electronic display 836, for example, a touch screen, non-touch screen, or other type of electronic display. If provided, the rich UI 832 and the electronic display 836 may be in operative communication with the processor 808 via any suitable connection architecture, such as the communications bus 828, among others.

In some embodiments, the wireless device 800 may optionally include one or more visual indicators 840 (e.g., LEDs, electronic display, etc.), for example, on the exterior surface 824, one or more aural indicators 844 (e.g., speaker, beeper, buzzer, etc.), and/or one or more haptic indicators 848 (e.g., vibrator, etc.) to indicate to a user information pertinent to the pairing method. Such information may include, among other things, entry into pairing mode, success or failure of pairing, detection of suspected adversarial wireless device (not shown), notice that the wireless device is located a proper distance away from another legitimate wireless device (not shown), notice to begin disturbing the propagations of the send signal 804DS and the receive signal 804DR, notice to end disturbing the propagations of the send and receive signals, instructions for locating the wireless device to a legitimate wireless device for effecting pairing, and instructions describing one or more techniques for the user to perform to properly disturb the propagations of the send and receive signal for effecting pairing, and any combination thereof. If the wireless device 800 includes a suitable rich UI 832, the wireless device may display any one or more of the foregoing pieces of information on the electronic display 836. The machine-executable instructions 812 may include any machine-executable instructions needed to provide the desired one(s) of the informational functionalities just described, and the memory 816 may contain the corresponding necessary data 852 for the selected functionality(ies), including any instructions that the wireless device 800 may provide to the user. If such instructions are included in the data 852, they may be in any one or more suitable forms, such as in a text file, an html file, a sound file, a graphics file, etc., depending on the manner in which the wireless device is configured to convey the information to a user.

The example wireless device 800 is provided to illustrate various features of the wireless device relating to its ability to participate in a pairing method of the present disclosure. Importantly, fundamentally there are no limitations on the type of wireless device that the wireless device 800 is, and, correspondingly, there is fundamentally no limitation on other functionality(ies) that the wireless device can provide. Because of the sheer breadth of the type of device that the wireless device 800 can be, FIG. 8 does not attempt to illustrate any other hardware and/or software (e.g., firmware) that the wireless device can include. This is so because those skilled in the art know what such hardware and software are and how to implement them without undue experimentation. A small set of nonlimiting examples of the types of wireless device that the wireless device 800 may be includes Internet access points (APs), mobile devices (e.g., smartphones, smartpads, smartwatches, laptops, etc.), desktop computers, printers, scanners, cameras, ear buds, headphones, microphones, headsets, smart appliances, audio speakers, WiFi® extenders, smart thermostats, smart lighting components (e.g., LED luminaires, switches, dimmers, etc.), remote controllers (e.g., for audiovisual systems), smart healthcare devices (e.g., blood-pressure monitors, medication-delivery pumps, etc.), and smart personal grooming devices (e.g., toothbrushes, shavers, etc.), among many others. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of pairing wireless devices, the method comprising:
    performing a pairing process that includes:
        wirelessly transmitting, from a first wireless device during a time period, a send signal;
        wirelessly receiving, by the first wireless device from a second wireless device during the time period, a receive signal;
        generating, by the first wireless device, first signal-strength-pattern information regarding a first signal-strength pattern of the receive signal received during the time period as determined by the first wireless device;
        wirelessly receiving, by the first wireless device from the second wireless device, second signal-strength-pattern information regarding a second signal-strength pattern of the send signal received during the time period by the second wireless device as determined by the second wireless device;
        determining, by the first wireless device, whether or not the first signal-strength-pattern information and the second signal-strength-pattern information substantially match one another; and
        when the first wireless device determines that the first signal-strength-pattern information and the second signal-strength-pattern information substantially match one another, determining that the second wireless device is a trusted device.

2. The method of claim 1, wherein the first signal-strength-pattern information comprises a first authentication key based on the first signal-strength pattern, and the second signal-strength-pattern information comprises a second authentication key based on the second signal-strength pattern.

3. The method of claim 2, wherein the first signal-strength-pattern information comprises a hash of the first authentication key, and the second signal-strength-pattern information comprises a hash of the second authentication key.

4. The method of claim 2, wherein the first signal-strength-pattern information comprises a first binary-string representation of a characteristic of the first signal-strength pattern, and the second signal-strength-pattern information comprises a second binary-string representation of the characteristic of the second signal-strength pattern.

5. The method of claim 4, wherein the characteristic is a pattern of extrema within the corresponding respective first and second signal-strength patterns.

6. The method of claim 1, wherein:
    receiving the receive signal includes receiving a plurality of indexed frames; and
    generating the first signal-strength-pattern information includes creating a first authentication key based on signal strengths over the plurality of indexed frames.

7. The method of claim 6, wherein creating the first authentication key includes:
    determining a signal-strength pattern over the plurality of indexed frames; and
    mapping the signal-strength pattern to the plurality of indexed frames.

8. The method of claim 6, wherein determining a signal-strength pattern includes:
    determining signal-strength extrema over the plurality of indexed frames; and
    converting each signal-strength extrema to a binary value;
    wherein creating the first authentication key includes stringing the binary values of the signal-strength extrema with one another in order of the plurality of indexed frames.

9. The method of claim 8, wherein:
    determining the signal-strength extrema includes:
        determining a mean signal strength over the plurality of indexed frames; and
        comparing signal-strength values with the mean signal strength over the plurality of indexed frames; and
    the method further includes assigning the binary values based on whether the signal-strength values are above or below the mean signal strength.

10. The method of claim 6, wherein generating the first signal-strength-pattern information includes generating a first hash of the first authentication key.

11. The method of claim 10, wherein:
    receiving the second signal-strength-pattern information includes receiving a second hash from the second wireless device and a set of frame indices that the second wireless device used to build the second hash;
    comparing the first and second signal-strength-pattern information with one another includes comparing the first and second hashes with one another; and
    determining whether the second wireless device is a trusted device includes determining that the second wireless device is a trusted device when the first and second hashes match one another.

12. The method of claim 1, further comprising:
    receiving a user indication to start the pairing process; and
    in response to receiving the user indication, beginning the pairing process.

13. The method of claim 1, further comprising, when the first device has determined that the second wireless device is a trusted device, bootstrapping, in cooperation with the second wireless device, a secure long-term connection between the first and second wireless devices.

14. The method of claim 13, further comprising, when the first device has determined that the second wireless device is a trusted device, registering the second wireless device as a trusted device.

15. The method of claim 1, further comprising transmitting, from the first wireless device, the first signal-strength-pattern information.

16. The method of claim 1, further comprising providing instructions to a user for pairing the first and second wireless devices with one another, wherein the instructions include instructing the user to:
place the first and second wireless devices at or within a distance of one another so as to provide space between the first and second wireless devices;
initiate the pairing process; and
after initiating the pairing process, move an object in proximity to the space between the first and second wireless devices during the time period.

17. The method of claim 16, wherein providing the instructions includes presenting the instructions to the user on the first wireless device.

18. The method of claim 17, wherein the first wireless device provides the instructions visually.

19. The method of claim 17, wherein the first wireless device provides the instructions aurally.

20. The method of claim 16, wherein the distance is 1 meter.

21. The method of claim 16, wherein the object is a hand of a user.

22. The method of claim 1, further comprising:
determining whether the receive signal has a signal strength below a set pairing threshold; and
when the signal strength is below the set pairing threshold, ignoring the receive signal.

23. The method of claim 22, wherein the set pairing threshold is based on a user-selection of a maximum pairing distance.

24. Machine memory containing machine executable instructions for performing the method of any one of claims 1-23.

25. A wireless device, comprising:
a radio;
one or more processors in operative communication with the radio; and
memory in operative communication with the one or more processors;
wherein the memory contains machine-executable instructions that, when executed by the one or more processors, perform the method of any one of claims 1-23 using the radio for the transmitting of the send signal and the receiving of each of the receive signals and the second signal-strength-pattern information.

* * * * *